Patented Mar. 18, 1941

2,235,790

UNITED STATES PATENT OFFICE 2,235,790

ARYL ALKYL GLUCOSIDES

Elwood V. White, Moscow, Idaho, assignor to The Dow Chemical Company, Midland, Mich., a corporation of Michigan No Drawing. Application September 13, 1939, Serial No. 294,689

6 Claims. (Cl. 260—210)

This invention relates to new aryl glycosides of alkyl glucoses and particularly to compounds having the general formula

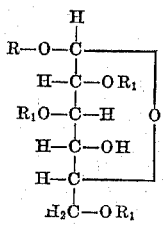

wherein R is an aryl group derived from a phenol having an ionisation constant in water of less than $10^{-7}$, and at least one of the radicals $R_1$ is alkyl or aralkyl, the remainder of them being hydrogen. Compounds having the configuration of the formula set forth are useful as plasticizers for the cellulose ethers. Further, they are valuable modifying agents for germicidal compositions. They are intermediates for the preparation of sorbitol aryl alkyl ethers, and the like. The new compounds may be made from the acyl esters of aryl glycoside ethers, preparation of which is described in my co-pending application, Serial No. 294,686, filed concurrently herewith. These acyl esters are subjected to saponification which preferentially removes the acyl groups from the compounds without at the same time hydrolyzing off the glycosidic groups. The reaction is illustrated by the following equation

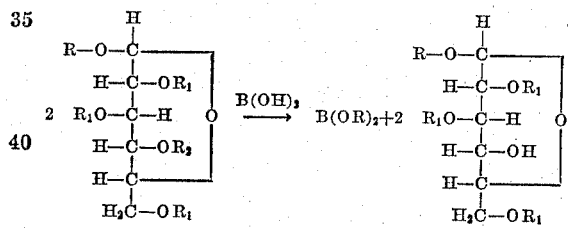

wherein R and $R_1$ have the previously defined meanings, $R_2$ is an acyl radical and $B(OH)_2$ is a hydroxide of an alkali metal. Similar reactions occur during the saponification of acyl esters of aryl glucoside ethers in which the acyl groups are substituted in position other than those shown, for example, in the 2 or the 3 positions.

Examples of compounds capable of undergoing the reaction shown in the foregoing equation are acyl esters of phenyl glucoside ethers, acyl esters of 2.6-dichloro-4-tertiary-butyl-phenyl glucoside ethers, acyl esters of 4-bromo-phenyl glucoside ethers, and acyl esters of 4-chloro-phenyl glucoside ethers. These compounds are derived from phenol, 2.6-dichloro-4-tertiary-butyl phenol, 4-bromo-phenol and 4-chloro-phenol, respectively, all of which have been found to possess hydrolytic dissociation constants of values less than $10^{-7}$. Compounds derived from phenols having hydrolytic dissociation constants of value greater than about $10^{-7}$ have been found to yield glucose ethers on saponification. For example, tribromo-phenyl acetyl ethyl glucoside, which is derived from a tribromo-phenol of dissociation constant $4.0 \times 10^{-7}$, gives ethyl glucose on boiling with caustic soda solution.

The following examples illustrate the practice of the invention:

EXAMPLE 1.—*The preparation of p-tertiary-butyl-phenyl ethyl glucoside*

A quantity of p-tertiary-butyl-phenyl acetyl ethyl glucoside of ethoxy content 26.8 per cent and density 1.076 at 25°/4° C., prepared in the manner described in the aforesaid co-pending application by treatment of bromo aceto ethyl glucose with sodium tertiary-butyl phenolate, was added to an equal weight of normal caustic solution and was brought into solution with the aid of the addition of methanol. The solution was boiled under a reflux condenser for one hour and then diluted with water. The cooled aqueous mixture was extracted several times with ethyl ether and the resulting ethereal extract was decolorized with animal charcoal, dried over anhydrous sodium sulphate and evaporated in vacuo. The product consisted of a viscid, honey-like syrup of p-tertiary-butyl-phenyl ethyl glucosides containing 32.4 per cent of ethoxy groups and having a refractive index of 1.4730.

EXAMPLE 2.—*Preparation of phenyl 2.3.6-triethyl glucoside*

A quantity of phenyl 4-acetyl 2.3.6-triethyl glucoside, prepared in the manner described in the foregoing example from halogen acetyl 2.3.6-triethyl glucoside, was heated with an aqueous methanol solution of caustic soda. The crystalline product isolated from this solution contained 39 per cent ethoxy groups.

EXAMPLE 3

The following table sets forth some of the properties of further aryl ethyl glucosides which have been prepared in a manner similar to that described in the foregoing examples:

| Name of glucoside | Characteristics of glucoside | |
|---|---|---|
| | Refractive index | Ethoxy content |
| p-Tert.-butyl-o-phenyl-phenyl mixed ethyl glucosides | | 21.9 |
| p-Bromo-phenyl mixed ethyl glucosides | 1.4892 | 37.9 |
| 2.6-dichloro-4-tertiary-butyl-phenyl mixed ethyl glucosides | 1.5055 | 28.7 |

I claim:

1. A 2.3.6-trialkyl ether of a glucoside of a phenol having a dissociation constant less than $10^{-7}$.

2. A 2.3.6-triethyl ether of a glucoside of a phenol having a dissociation constant less than $10^{-7}$.

3. Phenyl 2.3.6-triethyl glucoside.

4. A p-tertiary-butyl-phenyl ethyl glucoside, wherein an ethyl radical occupies at least one of the 2,3 and 6 positions in the glucose molecule, the remainder of the said positions being occupied by hydrogen, and the 4 position being unsubstituted.

5. A compound having the formula

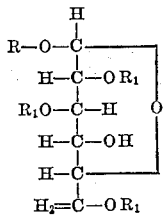

wherein R is an aryl group derived from a phenol having a dissociation constant less than $10^{-7}$ and at least one of the radicals $R_1$ is ethyl, the remainder of the radicals $R_1$ being hydrogen.

6. A p-bromo-phenyl ethyl glucoside having the general formula set forth in claim 5, wherein the radical R is the p-bromo-phenyl group.

ELWOOD V. WHITE.